Nov. 23, 1965 J. SMITHIES 3,219,834

TRANSFORMER CONVERSION AND PHASE CONTROL SYSTEM

Filed June 25, 1962 3 Sheets-Sheet 1

INVENTOR
JOHN SMITHIES
BY
*Shoemaker and Mattare*
ATTORNEYS

Nov. 23, 1965      J. SMITHIES      3,219,834
TRANSFORMER CONVERSION AND PHASE CONTROL SYSTEM
Filed June 25, 1962                3 Sheets-Sheet 2

INVENTOR.
JOHN SMITHIES
BY *Shoemaker and Mattare*

ATTORNEYS

Nov. 23, 1965    J. SMITHIES    3,219,834
TRANSFORMER CONVERSION AND PHASE CONTROL SYSTEM
Filed June 25, 1962    3 Sheets-Sheet 3

INVENTOR
John Smithies
BY
Shoemaker and Mattare
ATTORNEYS

United States Patent Office 3,219,834
Patented Nov. 23, 1965

3,219,834
TRANSFORMER CONVERSION AND PHASE CONTROL SYSTEM
John Smithies, Leeds, England (128 Woburn Drive, Hale, Altrincham, Cheshire, England)
Filed June 25, 1962, Ser. No. 204,982
23 Claims. (Cl. 307—83)

This invention relates to electrical supply equipment and has an important application in supply equipment incorporating frequency changing.

The invention is also applicable in some cases to apparatus for converting A.C. to D.C. and to apparatus for power factor correcting, either as a capacitor or as an inductor.

Frequency changing apparatus capable of handling power supplies and promoting control of the frequency over a reasonable range has important uses, particularly in the control of A.C. motors. However, such apparatus as has been employed hitherto has generally been expensive and cumbersome, involving large and relatively expensive rotating parts.

The present invention aims at providing an equipment useful for any of the above purposes (and other purposes mentioned below) which is relatively cheap and robust, and which involves a minimum of rotating parts.

The invention proposes a method of providing an electricity supply of pre-selected characteristics from an A.C. input of other characteristics, which comprises feeding to the primaries of two or more transformers, independently, an A.C. of the same frequency but of different phase, connecting in series across output supply terminals a portion of the secondary of one transformer, which portion is between a fixed connection and a variable connection to such secondary, and a portion of the secondary of another transformer, which portion is between a fixed connection and a variable connection to the latter secondary, and effecting variation of said variable connections by cyclically-operating control means so as, in each cycle of operation, simultaneously and progessively to maintain predetermined, but not necessarily constant, phase relationship with their associated secondary potential distributions, so that the outputs of the series-connected secondary portions add together instant by instant to give said pre-selected characteristics required in the resulting supply.

For providing a three-phase supply the improved method comprises feeding to the primaries of three transformers, independently, an A.C. of the same frequency but different phase, making individual variable connections to the secondaries of successive pairs of the three transformers in cyclic manner, effecting variation of said variable connections by cyclically-operating control means so as, in each cycle of operation, simultaneously and progressively to main predetemined, but not necessarily constant, phase relationship with their associated secondary potential distributions, and connecting in series across output supply terminals those portions of the said successive pairs of secondaries which are between fixed connections and the said individual variable connections thereto, whereby those portions of such series-connected secondary portions add together instant by instant to give said pre-selected characteristics required in the resulting supply.

The variations in the outputs of the connected secdaries will usually be of a stepwise character.

Apparatus according to the invention comprises two or more transformers, the primary windings of which are adapted to receive currents of the same frequency but each of different phase from the other or others, and the output from the portion of one secondary between a fixed and a variable connection thereto being connected in series with the output from the portion of another secondary between a fixed and a variable connection thereto across output supply terminals, and comprises also cyclically-operating control means for effecting variation of said variable connections progressively and simultaneously to maintain predetermined, but not necessarily constant, phase relationship with their associated secondary potential distributions, so that the outputs of the said series-connected secondary portions add together instant by instant to give said pre-selected characteristics required in the resulting supply.

Said cyclically-operating control means may for example include tap changing apparatus arranged to connect in the output circuit a section of each secondary winding which is continuously varied in magnitude and sense in accordance with the required output.

Apparatus according to the invention may be used as a rectifier, and as a capacitor or inductor. It may be employed for power factor correction.

In cases in which the equipment is employed for frequency changing, the tap changing or other control apparatus would be operated at a frequency which differs from the frequency of the voltage applied to the primary windings, such difference being equal to the required output frequency. In cases in which the equipment is required to supply a D.C. output, and when used as a capacitor or inductor, the tap changing or other control apparatus would be operated at the same frequency as the input voltage to the primary windings.

The equipment is applicable to the control of an A.C. motor and may be connected in the main supply to the stator in the case of a squirrel cage induction motor, or may be arranged to provide an auxiliary supply to the rotor in the case of a wound rotor induction motor.

The direction of transmission of power through the equipment is in all cases reversible, enabling it to be employed, for instance, in regenerative arrangements.

In order that the invention may be more clearly understood, reference will now be made to the accompanying schematic drawings, wherein.

Figure 8:
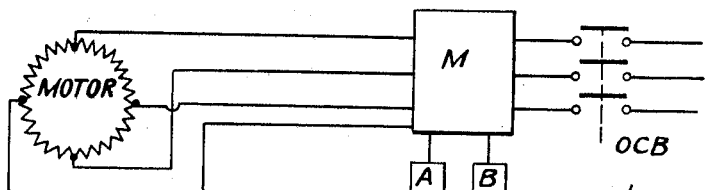
Figure 9:
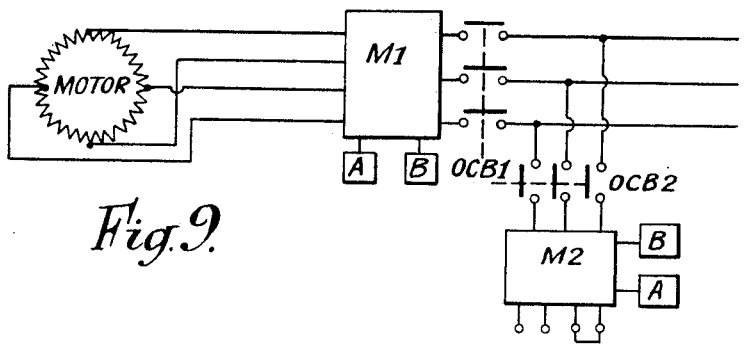

FIG. 8 similarly illustrates the application of the invention to the control of the speed of a squirrel cage induction motor; and FIG. 9 illustrates the invention applied to power factor correction in a layout such as is shown in FIG. 8.

Figure 1:
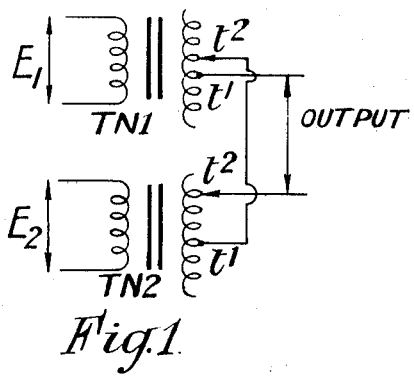
FIG. 1 illustrates diagrammatically the underlying idea or principle of the invention.

FIG. 1 illustrates the underlying idea or principle of the invention and shows two transformers TN1 and TN2. The primary of TN1 is fed with an alternating voltage E1 and the primary of TN2 is fed with an alternating voltage E2. These inputs have the same frequency but a 90° phase displacement between them. The secondary windings are each centre-tapped at tappings $t1$ and, in addition, have variable tapping points engaged by moving contacts $t2$. The sections of windings between the fixed and moving tapping points i.e. between $t1$ and $t2$ are connected in series with each other between the output terminals. It follows that if the tapping points $t2$ are moved up and down the secondary windings, the output from the secondaries is varied. If these variations occur synchronously with the variations of input voltage in the primaries, a D.C. voltage may be derived at the output terminals of the secondaries. Since reversal of the sense in the supply voltage is compensated for by the movable tapping points changing over to the opposite sides of the fixed tapping points, and because of the 90° phase displacement between the two transformers, it follows that when one secondary winding is delivering a zero output the other secondary winding is delivering a peak voltage, and that increase in the one is accompanied by decrease in the other throughout the cycle. When either movable tapping point coincides with one of the fixed tapping points, the other movable and fixed tappings do not coincide.

It follows also that if the movable tapping points *t2* are not varied synchronously with the supply but at a different frequency, then the output voltage from the secondaries will vary at a frequency dependent upon the difference between the supply frequency and the frequency at which the movable contacts are moved over the tapping points. In this way the equipment may be arranged to act as a frequency changer, and the frequency of the output may be controllable by varying the speed of movement of the contacts, it being assumed that the contact arms on both transformers are moved synchronously with respect to each other.

When the equipment is operated as a rectifier, the magnitude of the D.C. output voltage will depend on the degree of synchronism between the movement of the tappings and the applied primary voltage. Thus, the maximum output voltage (assumed positive) will be obtained if the instant when maximum number of turns in circuit coincides with the instant of maximum voltage in the transformer. The output voltage is in fact proportional to cosine α, where α is the angle between the phase of operation of the tappings and the applied voltage wave. The output voltage will be reduced to zero if α is 90° advance or retard. If α is 180°, the maximum negative voltage will be obtained. The maximum negative voltage will be equal in magnitude but opposite in sense to the maximum positive voltage. By choosing a suitable angle of advance or retard of the tappings relatively to the input voltage wave, it is possible to obtain any desired D.C. output voltage between the maximum positive and maximum negative values.

If the output power factor of the rectifier is taken as unity, then the input power factor will also be unity when the tappings are operated to give maximum position or maximum negative voltage (neglecting the magnetising current of the transformer). When operating at reduced voltage, the input power factor will equal cosine α as defined above.

Figure 1A:
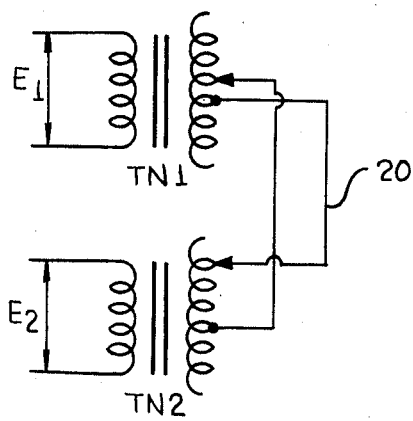
FIG. 1a is a wiring diagram similar to FIG. 1 illustrating a modification of the invention.

By advancing the phase of operation of the tappings by almost 90°, the D.C. output voltage will be reduced to almost zero. The input power factor will similarly become almost zero (current leading voltage). As seen in FIG. 1a, the equipment may be operated as a variable capacitor by short circuiting the output terminals together by means of an electrical connection 20 and operating with α just less than 90° advanced. This will produce a D.C. circulating current, the magnitude of which can be varied by varying α. The A.C. input current will vary at the same time, producing in effect a variation of the "capacity" of the equipment.

In a similar way, the equipment may be operated as a variable inductor by retarding the phase of operation of the tappings by almost 90°.

In practice the variable connection to a secondary winding need not necessarily be made directly as shown for moving contacts *t2* in FIG. 1, and tap changing apparatus similar in construction to the commutator of a D.C. machine may be employed, the tapping points being brought out to the commutator segments and the moving contacts being in the form of brushes revolving around the commutator.

Considering such embodiment for the arrangement of FIG. 1 each secondary is associated with an individual ring of stationary contacts, the top and bottom of the winding being respectively connected to the uppermost and lowermost stationary contacts, and successive equally spaced tapping points being connected to successive pairs of similar stationary contacts, one on each side of the ring. The centre-to-centre arcuate spacing of the stationary contacts in each ring will vary sinusoidally from the midpoint of one side to the midpoint of the other side.

It will be appreciated that the last described operation comprises changing the time period between tap changing steps while maintaining the potential difference between such steps constant. Equally well the time duration of each step may be maintained constant and the potential difference from step to step changed.

Referring now to FIGS. 2–5, the invention will be described as adapted to a three-phase star winding.

Figure 2:
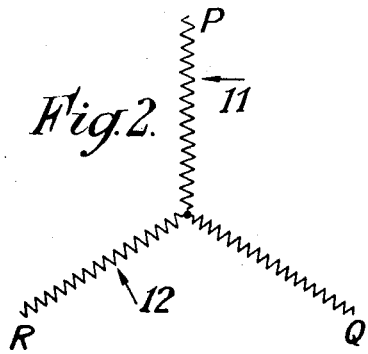
FIGS. 2–6 illustrate the adaption of the invention to 3-phase systems, FIGS. 2–5 including star windings and FIG. 6 including a delta winding.

FIG. 2 shows a star winding which might for example be employed as an autotransformer by connecting it directly to a three-phase source. Alternatively, the winding might form the secondary of a "conventional" transformer of which the primary would be connected to a three-phase source.

Each leg P, Q, R of the star winding is provided with tappings, and moving contacts 11 and 12 are provided to traverse the respective windings and make contact with the tappings during a cyclic rotation. The magnitude and phase angle of the voltage occurring between contacts 11 and 12 at any instant would depend on the relative position of the contacts on the respective windings. By moving the contacts 11 and 12 up and down the legs of the star, in cycles which are simultaneous but not necessarily synchronous, the voltage appearing between 11 and 12 can be caused to have a different frequency from the voltage supplied to the transformer from the three-phase source.

Figure 3:
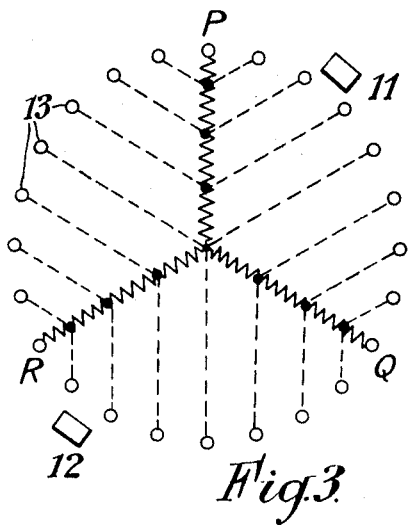

FIG. 3 shows how this could be achieved in practice by connecting the tappings of the windings to a ring of stationary contacts 13. The moving contacts 11 and 12 would travel around the ring of contacts at opposite ends of a diameter, and the direction and speed of such travel would determine the difference in frequency between the (three-phase) input to the transformer and the (single-phase) output. For example, if the frequency supplied to the transformer was 50 cycles per second, with the phases rising in the order P, Q, R, P, a speed of one revolution per second clockwise of the moving contacts would result in an output frequency of 50 minus 1, i.e. 49 cycles per second. If the rotation of the contacts is anti-clockwise at one revolution per second, the output frequency will be 50 plus 1, i.e. 51 cycles.

In the arrangement shown in FIG. 3, the output voltage would be constant in magnitude (neglecting the fluctuations which would occur in the course of commutation as the moving contact passes from one stationary contact to the next), independently of the speed of rotation of the contacts.

Figure 4:
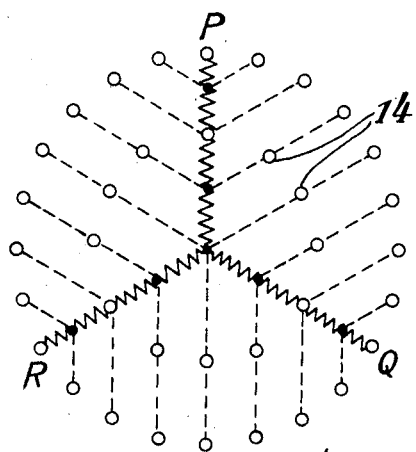

By providing a second ring of stationary contacts 14 as shown in FIG. 4, a different output voltage could be obtained by causing the moving contacts to rotate around this second ring. In practice, several rings of contacts could be provided to give a number of different output voltages selectively.

Figure 5:
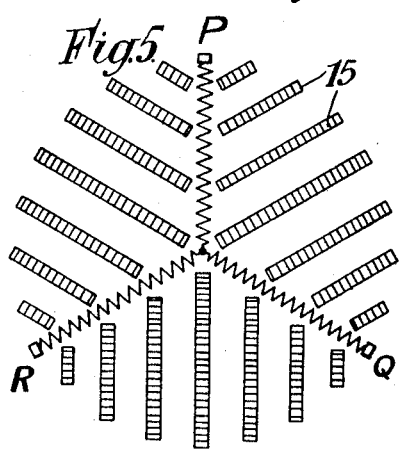

Alternatively, the rings of contacts could be replaced by rows of contacts 15 (or contact bars) as shown in FIG. 5. All the contacts in each row would be connected to the same tapping on the transformer winding. The moving contacts would travel in a circular path over the pattern of stationary contacts and the output voltage would depend on the diameter of such circular path, being greater for greater diameters.

Any number of output phases could be obtained by providing a corresponding number of pairs of moving contacts spaced at appropriate angles relative to each other about the circle.

Figure 6:
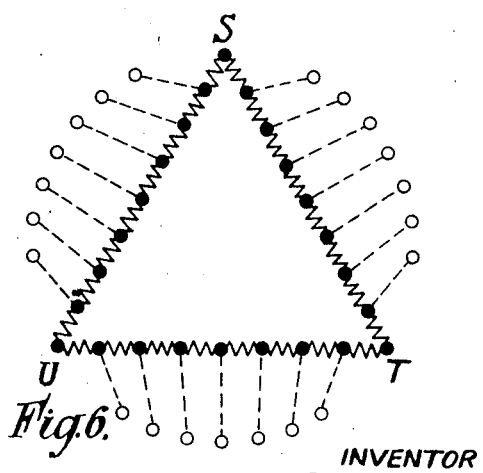

The invention could be applied also to a Delta connected transformer winding, and a possible arrangement is shown in FIG. 6. The tappings from the winding are connected to a ring of stationary contacts. A pair of moving contacts rotating around the ring would pick up a voltage of magnitude equal to $\sqrt{3/2}$ times the phase voltage (e.g. the volts between S and T) of the winding. The frequency of the output would depend on the direction and speed of rotation of the contacts, as in the case of a star winding.

Instead of the use of sliding contacts for taking the varying outputs from the secondaries of the transformers, the connection between the stationary contacts and the moving contact could be by means of a jet of mercury issuing from the moving contact, as is used for instance in a rotating mercury jet switch, or the connection between the stationary contacts and the moving contact could be obtained by means of a reciprocating movement of the moving contact, as for example in an automobile ignition "make and break."

In a modification, there could be several rows of fixed contacts connected to a winding, each row having a different number of contacts from each other row and the change being effected by switching from one row to another instead of (or as well as) altering the rate of movement of the moving contact.

Figure 1B:
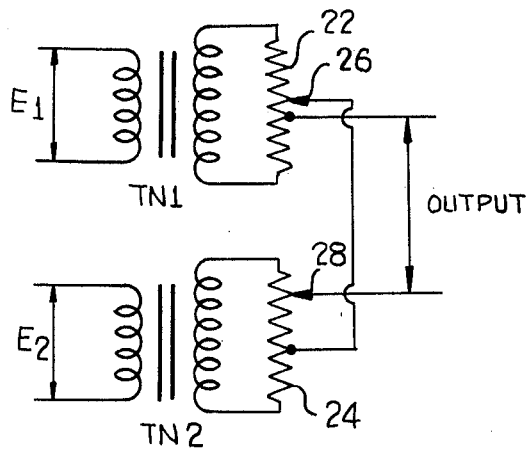
FIG. 1b is a further wiring diagram similar to FIG. 1 illustrating still another modified form of the invention.

In another modification of the invention as seen in FIG. 1b, the variation of output from the secondary windings is obtained by connecting resistors 22 and 24 across the secondary windings and providing variable tappings 26 and 28 respectively on such resistors, the outputs from the two resistors 22 and 24 being connected in series, and the said cyclically-operating control means being effective to vary the connected tappings.

A variation of voltage output may be obtained by varying the total amount of a winding over which the tap changing is carried out.

It will be noted that in FIGS. 2–6 described above the fixed connections to the secondaries, portions of which are connected in series at any time during operation, are not centre tappings as in FIG. 1 but are the common connection between such secondaries.

Figure 7:
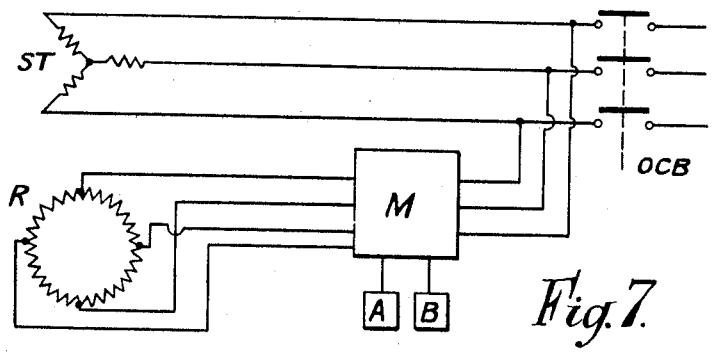
FIG. 7 illustrates an application of the invention to a wound rotor induction motor.

As above mentioned, when the equipment is used as a frequency changer it provides a convenient means of controlling the speed of an A.C. motor. FIG. 7 illustrates such a use of the invention in the case of a wound rotor induction motor. In this case a three-phase stator ST is supplied with current directly from the mains through a circuit breaker OCB, whilst a part of the supply is tapped off and applied to a frequency changer equipment M constructed in accordance with this invention. In the actual arrangement shown, the equipment M effects a three-phase/two-phase conversion, and feeds a two-phase supply to the tapping points arranged in quadrature on the rotor R. The equipment M is shown as provided with controls A and B, of which A controls the speed at which the moving contacts rotate, whilst B controls the displacement between the brushes, if it is desired to effect a variation in the output voltage. This may for example be effected by B consisting of a variable differential in the drive to the rotating contacts.

FIG. 8 shows the use of the invention as a frequency change control applied to a squirrel cage induction motor. In this case, the frequency change device is inserted directly in the supply to the squirrel cage motor and again effects a three-phase/two-phase conversion.

As above mentioned, the equipment may also be employed as a variable capacitor or inductor, for instance for power factor correction, and FIG. 9 shows such a use of the invention, incorporating the arrangement of FIG. 8. As shown, a frequency changing equipment M1 is inserted in the supply to the squirrel cage motor whilst a second equipment M2 is employed for power factor correction. This second equipment may be similar to M1 but with one pair of output terminals short-circuited.

In an alternative arrangement suited for cases where the motor may be subjected to heavy peak loads, the secondary terminals of the equipment M2, instead of being short-circuited, might be connected to an auxiliary motor driving a flywheel. This auxiliary motor would have a regenerative action and would temporarily relieve the power supply of the additional load at peak times.

What I claim is:

1. The method of providing an electricity supply of pre-selected characteristics from A.C. input of other characteristics, which comprises feeding to the primaries of two or more transformers, independently, an A.C. of the same frequency but of different phase, connecting in series across output supply terminals a portion of the secondary of one transformer, which portion is between a fixed connection and a variable connection to such secondary, and a portion of the secondary of another transformer, which portion is between a fixed connection and a variable connection to the latter secondary, and effecting variation of said variable connections by cyclically-operating control means so as, in each cycle of operation, simultaneously and progressively to maintain predetermined, but not necessarily constant, phase relationship with their associated secondary potential distributions, so that the outputs of the series-connected secondary portions add together instant by instant to give said pre-selected characteristics required in the resulting supply.

2. The method of providing an electricity supply of pre-selected characteristics from an A.C. input of other characteristics, which comprises feeding to the primaries of three transformers, independently, an A.C. of the same frequency but different phase, making individual variable connections to the secondaries of successive pairs of the three transformers in cyclic manner, effecting variation of said variable connections by cyclically-operating control means so as, in each cycle of operation, simultaneously and progressively to maintain predetermined, but not necessarily constant, phase relationship with their associated secondary potential distributions, and connecting in series across output supply terminals those portions of the said successive pairs of secondaries which are between fixed connections and the said individual variable connections thereto, whereby the output of such series-connected secondary portions add together instant by instant to give said pre-selected characteristics required in the resulting supply.

3. The method of claim 1, wherein the step of effecting variation of the variable connections in the progressive variation is a stepwise variation and comprises from step to step a change of relationship between potential difference and time.

4. The method of claim 3, wherein the step of effecting variation is made by changing the time period between step and step, the potential difference from step to step being constant.

5. The method of claim 3, wherein the step of effecting variation is made by changing the potential difference from step to step, the time duration of the steps being constant.

6. The method of claim 1 wherein the step of effecting variation of the variable connections to permit frequency changing is accomplished by making the frequency of the cycles of variation in said cyclically-operating control means different from the frequency of the current fed to the primaries.

7. The method of claim 1 wherein the step of effecting variation of the variable connections is adapted for supplying a D.C. by making the frequency of variation in said cyclically-operating means equal to the frequency of the A.C. fed to the primaries and by causing the variations in output from each secondary to effect a sense reversal synchronously with the reversal of sense in said A.C. supply.

8. The method of claim 1, wherein the step of effecting variation of the variable connections is adapted for power factor correction, wherein the output voltage is reduced substantially to zero by making the frequency of variation in said cyclically-operating means equal to the frequency of the A.C. fed to the primaries, and by making the former variation out of phase with the A.C. input waveform by a phase angle of substantially 90°, and such output voltage is then short-circuited, and wherein the input current is varied by varying said phase angle in one direction for the leading power factor and in the opposite direction for a lagging power factor.

9. Electrical equipment for the supply of current of pre-selected characteristics from an A.C. input of other characteristics comprising two or more transformers, the primary windings of which are adapted to receive currents of the same frequency but each of different phase from the other or others, a pair of output terminals, one of said output terminals being coupled from a portion of one secondary winding between a fixed and a variable connection thereon, the other of said output terminals being coupled from a portion of another secondary winding between a fixed and a variable connection thereon, said output terminals and said portions of said secondary windings being in series relationship, and comprising also cyclically-operating control means for effecting variation of said variable connections progressively and simultaneously to maintain predetermined, but not necessarily constant, phase relationship with their associated secondary potential distributions, so that the outputs of the said series-connected secondary winding portions add together instant by instant to yield said pre-selected characteristics.

10. Electrical equipment for the supply of current of pre-selected characteristics from an A.C. input of other characteristics comprising three transformers the primary windings of which are adapted to receive currents of the same frequency but each of different phase from the others, means for making variable connections to each of the secondaries of successive pairs of the three transformers in cyclic manner, and for connection in series across output supply teminals those portions of the pair of secondaries to which variable connections are made, between fixed connections thereto and said variable connections, and comprising cyclically-operating control means for, in each cycle of operation, simultaneously and progressively maintaining predetermined, but not necessarily constant, phase relationship between said variable connections and the potential distributions of the associated successive pairs of secondaries, whereby the outputs of the said series-connected secondary portions add together instant by instant to give said pre-selected characteristics required in the resulting supply.

11. Electrical equipment according to claim 9, wherein said cyclically-operating control means effects a stepwise variation in said outputs and is arranged to effect a change of relationship from step to step between potential difference and time.

12. Electrical equipment according to claim 9, wherein said cyclically-operating control means effects a stepwise variation in said outputs and is arranged to effect a change of relationship from step to step between potential difference and time and said change of relationship from step to step is effected by varying the distance between tapping points from said secondary windings, the potential difference between such tappings being constant, and by moving contacts from tapping point to tapping point in succession.

13. Electrical equipment according to claim 12, wherein each of said secondary windings is provided with a fixed tapping point and a variable tapping point, and the distance between the tappings is varied by moving the variable tapping point.

14. Electrical equipment according to claim 9, wherein first and second contacts for each of said secondary windings have a synchronous movement over a series of tapping points the distance between which is progressively varied.

15. Electrical equipment according to claim 14, wherein the said tapping points are arranged in a circular path in which the moving contacts travel, each traverse of said path representing one cycle of the cyclically-operating control means.

16. Electrical equipment according to claim 10, wherein the cyclically-operating control means regulates the frequency of the output supply by varying the speed at which distances between tappings are varied.

17. Electrical equipment according to claim 10, adapted for a polyphase output by having for each primary a number of secondaries corresponding to the number of phases required, with the variable output of each such secondary of one transformer being series connected with the output of the corresponding secondary in each other transformer.

18. Electrical equipment as cliamed in claim 9, including a resistor connected across each secondary winding and providing variable tappings on such resistors for varying the output from the secondary windings, the outputs from the several resistors being connected in series, and the said cyclically-operating control means being effective to vary the connected tappings.

19. Electrical equipment as claimed in claim 9, wherein said cyclically-operating control means reduce the output voltage substantially to zero to result in rectification, by making the frequency of variation in said cyclically-operating means equal to the frequency of the A.C. fed to the primaries of the transformers, and by making the former variation out of phase with the A.C. input waveform, the out-of-phase angle being varied whereby the input current is varied.

20. The electrical equipment as claimed in claim 9 including means for short circuiting said output terminals and wherein said cyclically-operating control means adapts said equipment for use as a reactance by reducing the output voltage substantially to zero and means for varying the input current by varying in the region of 90°, the phase angle between the input voltage frequency and the frequency of the cycles of tap-changing.

21. The combination as defined in claim 10 including a resistor coupled across each secondary winding, variable taps on each said resistor for varying the output from said secondary windings, the outputs from the several resistors being coupled in series relationship and said cyclically-operating control means being operative to vary the connected taps.

22. Means for supplying an electrical manifestation of predetermined characteristics to transformer secondary windings from an A.C. supply source of other characteristics comprising at least two transformers, the primary windings of which are adapted to receive energy of substantially the same frequency but of different phase, a first output terminal coupled to a fixed tap on one of said secondary windings, a second output terminal coupled to a movable tap on the other of said secondary windings, means coupling the one secondary winding to the other secondary winding through a movable and a fixed tap, respectively, and cyclically-operable control means for effecting variation of said movable taps to maintain predetermined phase relationship with their associated secondary potential distributions so that the outputs at said output terminals are summed to yield said predetermined electrical characteristics.

23. Means for supplying an electrical manifestation of predetermined characteristics from an A.C. supply source of other characteristics comprising at least one transformer having primary and secondary windings the primary windings of which are adapted to receive energy of substantially the same frequency but of different phase, a plurality of fixed taps positioned about each of said secondary windings, means for connecting predetermined positions on said secondary windings, progressively, to a corrsponding tap, a position to a tap, a pair of movable contacts diametrically opposite each other for successively engaging said taps for connecting in series between said contacts portions of said secondary windings and cyclically-operating control means for, in each cycle of operation, simultaneously and progressively maintaining predetermined phase relationship between said contacts and the potential distributions of the associated secondary windings, whereby the output across said contacts are summed to yield said predetermined characteristics.

References Cited by the Examiner

UNITED STATES PATENTS

| | | | |
|---|---|---|---|
| 2,341,280 | 2/1944 | Ludbrook | 323—109 |
| 2,908,856 | 10/1959 | Kall | 322—17 |

FOREIGN PATENTS 899,631  6/1962  Great Britain.

LLOYD McCOLLUM, *Primary Examiner.*